(No Model.)

J. LYNCH.
DRAIN TILE.

No. 271,089. Patented Jan. 23, 1883.

WITNESSES
Franck L. Ourand
Wm. A. Garner

INVENTOR
John Lynch.
per L. Deane
His Attorney

UNITED STATES PATENT OFFICE.

JOHN LYNCH, OF PORTLAND, MAINE.

DRAIN-TILE.

SPECIFICATION forming part of Letters Patent No. 271,089, dated January 23, 1883.

Application filed December 2, 1882. (No model.)

*To all whom it may concern:*

Be it known that I, JOHN LYNCH, a citizen of the United States, residing at Portland, in the county of Cumberland and State of Maine, have invented certain new and useful Improvements in Drain-Tile; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
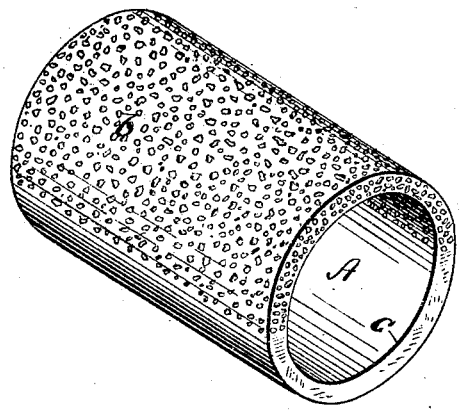
Figure 2:
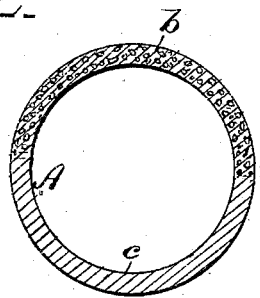

Figure 1 is a perspective view of a drain-tile. Fig. 2 is a cross-section of Fig. 1.

This invention is designed as an improvement in drain-tile; and the novelty consists in making one part of the tube or cylinder porous and the other with a close or glazed surface, all as will now be more fully set out and explained.

In the drawings, A denotes a drain-tile designed for use in any well-known way. Its upper portion—say about one-half of it on a line from end to end—(now marked $b$) is porous, as indicated by the lines $b'$. The lower part, $c$, of this tile has a close or glazed surface. The drain-tile may be made porous by mixing with the clay sawdust, coal-dust, or any other vegetable matter which will burn out and leave the body porous. The clay thus prepared is made into tile by any machinery suitable for the purpose. When the tile is sufficiently dry for burning, the part which is to form the bottom when laid in the ground is dipped in a slip or glaze, which will, when burned, form a coating and glazed surface, leaving the top of the tile porous. The tile may be burned soft before glazing and afterward dipped and reburned to obtain the glaze. A clay slip such as is used for glazing sewer-pipe will be found best, but any other glaze will answer the purpose; but I do not limit myself to any peculiar form or detail of manufacture, as this can be varied in a great many ways.

The advantages of the drain-tile made with a close or glazed bottom and porous top are the more rapid absorption of the water from the ground through the porous top and the more rapid draining over the close or glazed bottom. The great defect in drain-tile has been the difficulty in providing for the water to get into the tile without admitting earth and sediment, so as to stop the passage of the water. The upper part or top of my tile acts as a filter, admitting only water, and the close or glazed bottom facilitates the flow of the water. A minor advantage is a reduction of the weight to about one-half the solid tile, which lessens in that proportion the cost of transportation.

Having now described my invention, what I consider new, and desire to secure by Letters Patent, is—

1. A drain-tile one part of which in longitudinal section is porous and the other part having a glazed or solid surface, substantially as described.

2. The drain-tile A, having its portion $b$ porous and its portion $c$ close or glazed, substantially as described.

In testimony whereof I affix my signature in presence of two witnesses.

JOHN LYNCH.

Witnesses:
CHARLES P. WEBSTER,
GEORGE T. COOK.